United States Patent [19]

Bauer et al.

[11] Patent Number: 5,085,297

[45] Date of Patent: Feb. 4, 1992

[54] FRICTIONAL DAMPER

[76] Inventors: Hans-Peter Bauer, Ziegelhütte 9; Hans J. Bauer, Am Eichenhain 8; Ludwig Stadelmann, Schopperstrasse 14, all of D-8503 Altdorf, Fed. Rep. of Germany

[21] Appl. No.: 551,222

[22] Filed: Jul. 11, 1990

[30] Foreign Application Priority Data

Jul. 13, 1989 [DE] Fed. Rep. of Germany ....... 3923087

[51] Int. Cl.⁵ .............................................. F16F 7/08
[52] U.S. Cl. ..................................... 188/129; 188/381; 267/134
[58] Field of Search ........... 188/129, 381, 271, 264 R, 188/264 B, 264 D, 264 E, 264 CC; 267/134, 135

[56] References Cited

U.S. PATENT DOCUMENTS

| 1,510,825 | 10/1924 | Bousquet | 188/264 B |
| 2,856,050 | 10/1958 | Mathews | 188/264 B |
| 4,729,458 | 3/1988 | Bauer et al. | 188/129 |
| 4,946,008 | 8/1990 | Bauer et al. | 188/129 |

Primary Examiner—Matthew C. Graham
Attorney, Agent, or Firm—Browdy and Neimark

[57] ABSTRACT

A frictional damper, in particular for washing machines with spinning action, comprises a circular cylindrical housing and a tappet which is coaxially displaceable inside the housing and extends out of it with one end, the other end being provided with a friction piston. The friction piston has at least one friction coating made of an elastically resilient material and is provided with a grease chamber. In order to prevent a decrease of damping because of change from lubricated to dry friction, the grease storage chamber is provided within the friction piston and is connected with the at least one support segment by way of at least one grease channel.

26 Claims, 1 Drawing Sheet

FRICTIONAL DAMPER

FIELD OF THE INVENTION

The invention relates to a frictional damper, in particular for washing machines with spinning action, comprising a substantially circular cylindrical housing and a tappet which is coaxially displaceable inside it and extends out of it with one end, the other end being provided with an approximately cylindrical friction piston, the friction piston having at least one approximately circular cylindrical support segment and bracing flanges radially extending beyond the latter and axially limiting the latter at fixed distances, a friction coating made of an elastically resilient material being disposed on the support segment and between the bracing flanges and being elastically pressed against the inner wall of the housing, and a grease storage chamber being formed on the friction piston.

BACKGROUND OF THE INVENTION

Frictional dampers of this type are known from U.S. Pat. No. 4,729,458. These lubricated frictional dampers have had extraordinary success in practical use; they are used in particular large numbers in washing machines. Customarily the friction coatings comprise cellular, foamed plastic, the cells of the plastic being impregnated with grease. It has been shown that with extreme loads over long periods of time the friction changes from lubricated to dry friction, i.e. the frictional damper heats up to high degree. In order to minimize this disadvantage, grease chambers have been provided on the outside of the friction piston in the form of an annular groove containing a little supply of additional grease. But this measure did not basically eliminate the problem, either.

SUMMARY OF THE INVENTION

It is therefore an object of the invention to improve a frictional damper of the type according to the species in such a way that a decrease of damping because of a change from lubricated to dry friction is prevented.

This object is achieved by the invention in that a grease storage chamber is provided within the friction piston and is connected with the at least one support segment by way of at least one grease channel.

By means of the grease storage chamber provided according to the invention a permanent re-impregnation of the friction coatings is realized. The grease travels in small quantities through the grease channels to the friction coatings and through the latter to the friction surface between friction coating and inner wall of the housing.

When in an advantageous embodiment of the invention the grease storage chamber is limited by an insert body located in the friction piston, then the grease chamber itself is easy to manufacture on the one hand, and it is in particular easy to install with a grease filling in the friction piston. The latter is furthermore possible in a particularly simple manner, when on the one hand the insert body bears against the front end of the tappet facing the interior space of the housing, and when on the other hand the insert body is elastically interlocking with the tappet by means of barbed-hook-type fastening webs engaging with recesses of the tappet.

In order to prevent grease from getting from the storage chamber into the tappet and from there to the outside, it is advantageous for the insert body to be sealed towards an inner wall of the friction piston in the vicinity of an end facing the interior space of the tappet.

When the at least one grease channel has a diameter of about 1.0 to 1.5 mm, it is ensured that the respective friction coating does not press into the respective grease channel, which prevents in turn that the frictional force between friction coating and inner wall of the housing decreases in this area.

When according to a further advantageous embodiment of the invention an extension tube is formed on the end of the tappet which is inside the housing, which, together with the adjacent bracing flange and the inner wall of the housing, defines a grease collecting chamber, the deposition of grease is prevented at places in the housing not connected with the friction coating. In particular, the grease cannot reach the hollow space of the tappet, where it would no longer be used for lubrication. There would further be the risk that grease which has entered the interior space of the tappet gets to the outside through openings provided in the tappet. Any grease spread on the inner wall of the housing when the tappet moves out of the housing is re-collected when the tappet enters the housing. The extension tube may be provided on the insert body.

When in a further embodiment of the invention the friction coating consists of cellular foamed plastic material and in particular of at least partially open-cellular foamed plastic material, then the grease travels through the friction coating on the one hand. On the other hand a kind of pumpage occurs in the friction coating due to the changing deformations during a work cycle, which pumpage also leads to grease being conveyed through the friction coating.

Further details of the invention will become apparent from the ensuing description of an exemplary embodiment taken in conjunction with the drawing.

DESCRIPTION OF THE PREFERRED EMBODIMENT

Figure 1:
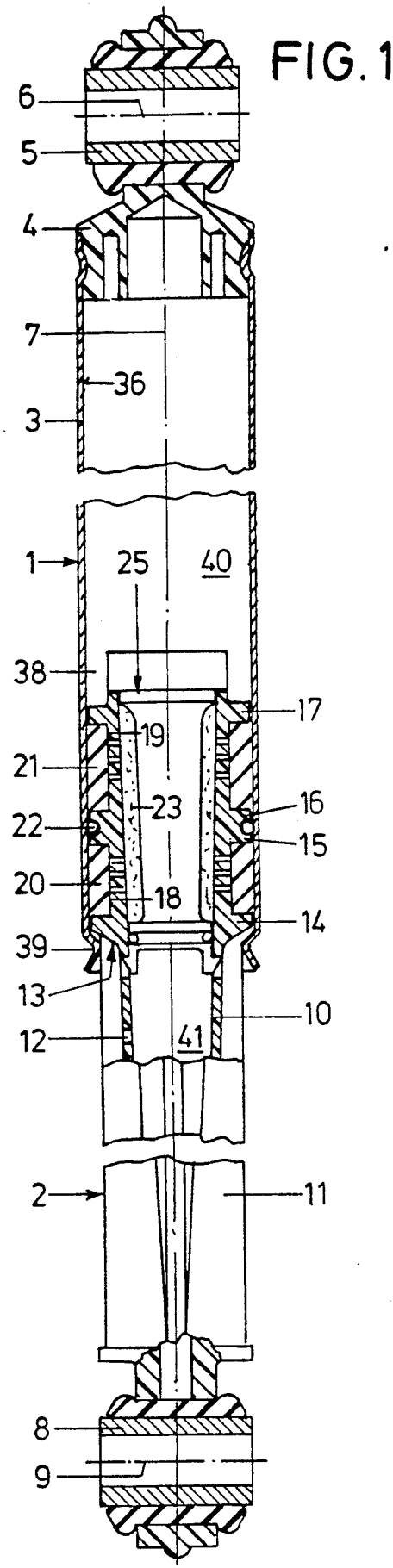
FIG. 1 is a longitudinal section of a frictional damper according to the invention.
Figure 2:
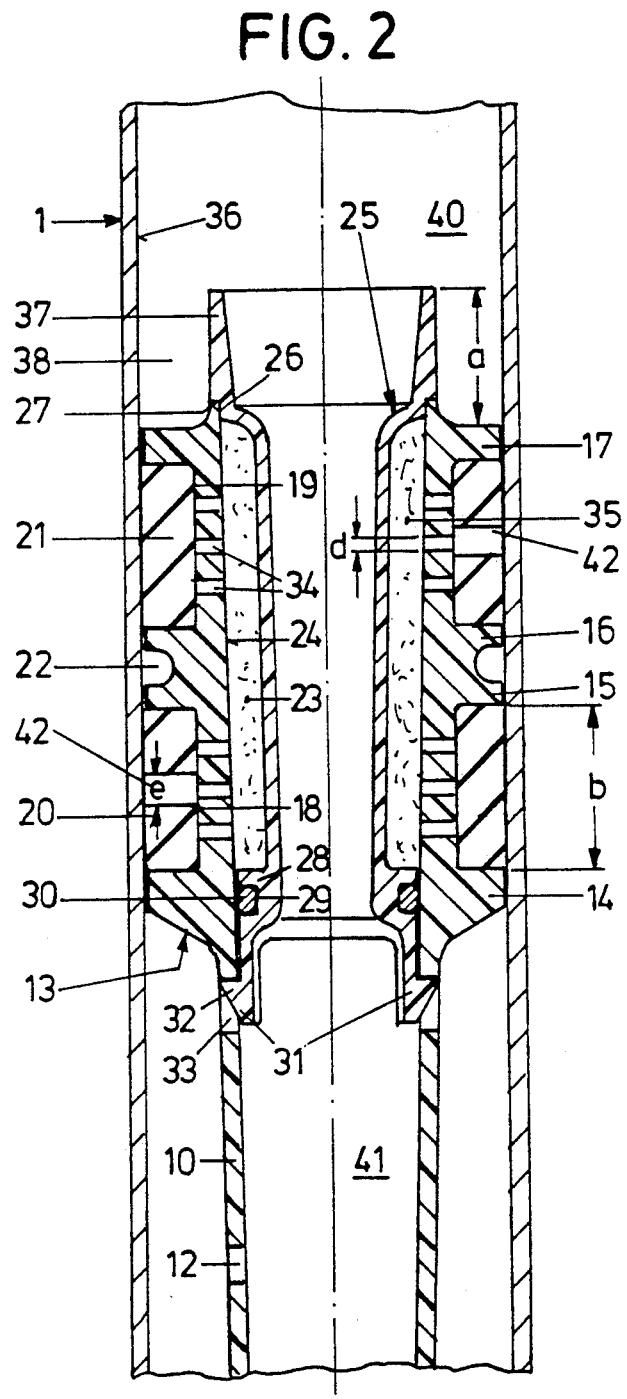
FIG. 2 is a partial longitudinal section of a frictional damper on a larger scale as compared with FIG. 1.

The frictional damper illustrated in the drawing comprises a housing 1 and a tappet 2. The housing 1 essentially consists of a cylindrical metallic pipe 3 closed at one end by means of a bottom 4. A guide sleeve 5 for connecting the frictional damper is disposed on the exterior of the bottom 4. This guide sleeve 5 has an axis of symmetry 6 used as pivoting axis, which vertically intersects the center longitudinal axis 7 of the frictional damper.

The tappet 2 also is provided with a guide sleeve 8 at its extreme end, the axis 9 of which also vertically intersects the center longitudinal axis 7, The tappet 2 is essentially comprised of a pipe 10, which tapers towards the guide sleeve 8 and which is reinforced on its outside by means of longitudinal ribs 11. The pipe 10 is provided with an exhaust opening 12. The tappet 2 is injection-molded of plastic in one piece.

A friction piston 13 is formed on the inner end of the tappet 2 located inside the housing 1, which has annular bracing flanges 14, 15 and 16, 17, which are associated in pairs. Between the bracing flanges 14, 15 or 16, 17, respectively associated with each other, approximately circular cylindrical support segments 18, 19 are provided and are also disposed concentrically to the axis 7. On each of the support segments 18, 19 a friction coating 20, 21 is disposed. These friction coatings 20, 21 consist of cellular, elastic foam material, for example polyurethane foam.

Between the adjoining bracing flanges 15, 16 and thus also between the friction coatings 20, 21, a grease chamber 22 in the shape of an annular groove is disposed, which has a relatively little volume in comparison to the volume of the friction coatings 20 or 21. A grease storage chamber 23 comparatively large in volume is arranged on the inner side of the friction piston 13 and is limited outside by the inner wall 24 of the friction piston 13 and inside and at its axial ends by an insert body 25. This insert body 25 rests with an annular collar 26 against the front end 27 of the friction piston 13 and the area adjoining the latter of the inner wall 24, so that the insert body 25 is fixed radially on the one hand and axially in direction towards the guide sleeve 8 on the other hand relative to the friction piston 13.

At its other end facing the guide sleeve 8 the insert body 25 has a cylinder section 28 in which an annular groove 29 is provided. An O-ring packing is located in the latter and rests against the inner wall 24 of the friction piston 13, and that in the vicinity of the bracing flange 14 situated closest to the guide sleeve 8. The storage chamber 23 thus extends over approximately the whole axial length of the friction piston 13.

Two fastening webs 31 join the cylinder section 28 each having a barbed-hook-type projection 32 projecting radially outwards and engaging with a corresponding recess 33 in the pipe 10 of the tappet 2 when the insert body 25 is mounted. The fastening webs 31 are such that they are elastically deflected radially inwards when the insert body 25 is slid into the tappet 2. This is ensured in that the whole insert body is made in one piece from an appropriate plastic material. The recesses 33 can simultaneously serve as exhaust openings so that the exhaust opening 12 is not needed as an additional opening. Grease channels 34 are provided in the friction piston 13 in the vicinity of the support segments 18, 19 and connect the storage chamber 23 with the friction coatings 20 and 21, respectively. The diameter d of these channels is approximately 1.0 to 1.5 mm, the diameter d and the number of channels 34 per support segment 18 and 19, respectively, essentially depending on the viscosity of the grease 35 contained in the storage chamber 23.

It is not useful to choose a diameter d of the channels 34 of substantially more than 1.5 mm, since, lacking support in the vicinity of the channels 34, the friction coatings 20, 21 would otherwise change their friction properties towards the inner wall 36 of the housing 1.

The grease 35 travels through the channels 34 into the vicinity of the support segments 18, 19 and from there right through the friction coatings 20, 21 to the friction face between the friction coatings 20, 21 and the inner wall 36 of the housing 1. To this effect the foamed plastic forming the friction coatings 20, 21 is at least partially open-cellular, which is precisely the case with polyurethane foamed material.

An extension tube 37 is molded in one piece with the inner end of the insert body 35 and extends axially by a dimension a over the bracing flange 17 at the side of the end, the dimension a corresponding approximately to the axial length b of the friction coatings 20 and 21, respectively. This extension tube 37 in concert with the associated bracing flange 17 and the inner wall 36 of the pipe 3 forms a grease collecting chamber 38. At its open end the pipe 3 is provided with a crimp directed inwards, which is arranged after the tappet 2 has been slid into the housing 1 in order to prevent the tappet from being inadvertently drawn out of the housing 1.

The insert body 25 is provided hollow, i.e. about tube-shaped, so that the interior space 40 of the housing 1 is connected with the interior space 41 of the tappet 2; any oscillating movements of the tappet 2 relative to the housing 1 thus do not result in a compression of the air in the frictional damper; rather, a permanently changing air current out of or into the frictional damper can take place by way of the exhaust opening 12 and/or the recesses 33.

When the permeability of the friction coating 20, 21 is not sufficient to transport sufficient grease 35 from the storage chamber 23 to the friction face between the friction coating 20 and 21, respectively, on the one and hand and the inner wall 36 of the housing 1 on the other hand, it may be useful to provide at least one opening 42 in one or both of the friction coatings 20 and 21, respectively, for instance by punching. Such an opening 42 should be arranged such that it overlaps at least in part with at least one grease channel 34 so that the grease transport is ensured. To this effect it is useful that its width or its diameter e, respectively, equals the diameter d of the channel 34 or is larger than it. Moreover the opening 42 should be arranged in the level of a channel 34.

What is claimed is:

1. A frictional damper for washing machines with a spin cycle, comprising a substantially circular cylindrical housing (1) having an axis (7), an interior space (40) and an inner wall (36) and a tappet (2) coaxial with said cylindrical housing (1), said tappet displaceable inside said housing (1) and extending out of said housing (1) with one end, another end of the tappet (2) being provided with an approximately cylindrical friction piston (13), the friction piston (13) having at least one approximately circular cylindrical support segment (18, 19) and bracing flanges (14 to 17) extending radially from said axis (7) beyond the support segment (18, 19) and limiting the support segment (18, 19) at fixed distances in the direction of said axis (7), a friction coating (20, 21) made of an elastically resilient material being disposed on the support segment (18, 19) and between the bracing flanges (14 to 17) and being elastically pressed against the inner wall (36) of the housing (1), and a grease storage chamber (23) being formed on the friction piston (13), wherein said grease storage chamber (23) is provided within the friction piston (13) and is connected with the at least one support segment (18, 19) by way of at least one grease channel (34).

2. A frictional damper in accordance with claim 1, wherein said grease storage chamber (23) is limited by an insert body (25) located in the friction piston (13).

3. A frictional damper in accordance with claim 2, wherein the insert body (25) bears against a front end (27) of the tappet (2) facing the interior space (40) of the housing (1).

4. A frictional damper in accordance with claim 2, wherein the insert body (25) is elastically interlocking with the tappet (2) by means of barbed-hook-type fastening webs (31) engaging with recesses (33) of the tappet (2).

5. A frictional damper in accordance with claim 2, wherein the insert body (25) is sealed towards an inner wall (24) of the friction piston (13) in the vicinity of an end facing the interior space (41) of the tappet (2).

6. A frictional damper in accordance with claim 1, wherein the at least one grease channel (34) has a diameter (d) of about 1.0 to 1.5 mm.

7. A frictional damper in accordance with claim 1, wherein an extension tube (37) is formed on the end of the tappet (2) which is inside the housing (1), said extension tube (37) together with an adjacent bracing flange (17) and said inner wall (36) of said housing (1) defines a grease collecting chamber (38).

8. A frictional damper in accordance with claim 7, wherein said extension tube (37) is formed on the insert body (25).

9. A frictional damper in accordance with claim 1, wherein said friction coating (20, 21) consists of cellular, foamed plastic material.

10. A frictional damper in accordance with claim 9, wherein said friction coating (20, 21) consists of at least partially open-cellular, foamed plastic material.

11. A frictional damper in accordance with claim 1, wherein said friction coating (20, 21) has at least one opening (42) passing from said support segment (18, 19) to said inner wall (36) of the housing (1).

12. A frictional damper in accordance with claim 11, wherein said at least one opening (42) overlaps at least in part with said grease channel (34).

13. A frictional damper in accordance with claim 11, wherein the width (e) of said opening (42) equals at least said diameter (d) of the grease channel (34).

14. A frictional damper for washing machines with a spin cycle comprising a substantially circular cylindrical housing (1) having an axis (7), an interior space (40) and an inner wall (36) and a tappet (2) coaxial with said cylindrical housing (1), said tappet displaceable inside said housing (1) and extending out of said housing (1) with one end, another end of the tappet (2) being provided with an approximately cylindrical friction piston (13), the friction piston (13) having at least one approximately circular cylindrical support segment (18, 19) and bracing flanges (14 to 17) extending radially from said axis (7) beyond the support segment (18, 19) and limiting the support segment (18, 19) at fixed distances in the direction of said axis (7), a friction coating (20, 21) made of an elastically resilient material being disposed on the support segment (18, 19) and between the bracing flanges (14 to 17) and being elastically pressed against the inner wall (36) of the housing (1), and a grease storage chamber (23) being formed on the friction piston (13), wherein said grease storage chamber (23) is provided within the friction piston (13) and is connected with the at least one support segment (18, 19) by way of at least one grease channel (34), said grease storage chamber (23) being limited by a wall located in and connected to said friction piston (13).

15. A frictional damper for washing machines with a spin cycle comprising a substantially circular cylindrical housing (1) having an axis (7), an interior space (40) and an inner wall (36) and a tappet (2) coaxial with said cylindrical housing (1), said tappet displaceable inside said housing (1) and extending out of said housing (1) with one end, another end of the tappet (2) being provided with an approximately cylindrical friction piston (13), the friction piston (13) having at least one approximately circular cylindrical support segment (18, 19) and bracing flanges (14 to 17) extending radially from said axis (7) beyond the support segment (18, 19) and limiting the support segment (18, 19) at fixed distances in the direction of said axis (7), a friction coating (20, 21) made of an elastically resilient material being disposed on the support segment (18, 19) and between the bracing flanges (14 to 17) and being elastically pressed against the inner wall (36) of the housing (1), and a grease storage chamber (23) being formed on the friction piston (13), wherein said grease storage chamber (23) is provided within the friction piston (13) and is connected with the at least one support segment (18, 19) by way of at least one grease channel (34), said grease storage chamber (23) being limited by an insert body (25) located in the friction piston (13).

16. A frictional damper for washing machines with a spin cycle comprising a substantially circular cylindrical housing (1) having an axis (7), an interior space (40) and an inner wall (36) and a tappet (2) coaxial with said cylindrical housing (1), said tappet displaceable inside said housing (1) and extending out of said housing (1) with one end, another end of the tappet (2) being provided with an approximately cylindrical friction piston (13), the friction piston (13) having at least one approximately circular cylindrical support segment (18, 19) and bracing flanges (14 to 17) extending radially from said axis (7) beyond the support segment (18, 19) and limiting the support segment (18, 19) at fixed distances in the direction of said axis (7), a friction coating (20, 21) made of an elastically resilient material being disposed on the support segment (18, 19) and between the bracing flanges (14 to 17) and being elastically pressed against the inner wall (36) of the housing (1), and a grease storage chamber (23) being formed on the friction piston (13), wherein said grease storage chamber (23) is provided within the friction piston (13) and is connected with the at least one support segment (18, 19) by way of at least one grease channel (34), said grease storage chamber (23) being limited by an insert body (25) located in the friction piston (13), and said insert body (25) bears against a front end (27) of the tappet (2) facing the interior space (40) of the housing (1).

17. A frictional damper in accordance with claim 16, wherein the insert body (25) is elastically interlocking with the tappet (2) by means of barbed-hook-type fastening webs (31) engaging with recesses (33) of the tappet (2).

18. A frictional damper in accordance with claim 16, wherein the insert body (25) is sealed towards an inner wall (24) of the friction piston (13) in the vicinity of an end facing the interior space (41) of the tappet (2).

19. A frictional damper in accordance with claim 16, wherein the at least one grease channel (34) has a diameter (d) of about 1.0 to 1.5 mm.

20. A frictional damper in accordance with claim 16, wherein an extension tube (37) is formed on the end of the tappet (2) which is inside the housing (1), said extension tube (37) together with an adjacent bracing flange (17) and said inner wall (36) of said housing (1) defines a grease collecting chamber (38).

21. A frictional damper in accordance with claim 20, wherein said extension tube (37) is formed on the insert body (25).

22. A frictional damper in accordance with claim 16, wherein said friction coating (20, 21) consists of cellular, foamed plastic material.

23. A frictional damper in accordance with claim 22, wherein said friction coating (20, 21) consists of at least partially open-cellular, foamed plastic material.

24. A frictional damper in accordance with claim 16, wherein said friction coating (20, 21) has at least one opening (42) passing from said support segment (18, 19) to said inner wall (36) of the housing (1).

25. A frictional damper in accordance with claim 24, wherein said at least one opening (42) overlaps at least in part with said grease channel (34).

26. A frictional damper in accordance with claim 24, wherein the width (e) of said opening (42) equals at least the diameter (d) of said grease channel (34).

* * * * *